J. CAMPBELL.
CORN-PLANTERS.

No. 195,570. Patented Sept. 25, 1877.

2 Sheets—Sheet 2.

J. CAMPBELL.
CORN-PLANTERS.

No. 195,570. Patented Sept. 25, 1877.

Attest
A. M. Warner
Edward Issen

Inventor
James Campbell
by Wood & Boyd
Attorneys

UNITED STATES PATENT OFFICE.

JAMES CAMPBELL, OF HARRISON, OHIO.

IMPROVEMENT IN CORN-PLANTERS.

Specification forming part of Letters Patent No. 195,570, dated September 25, 1877; application filed July 3, 1877.

*To all whom it may concern:*

Be it known that I, JAMES CAMPBELL, of Harrison, in the county of Hamilton and State of Ohio, have invented certain new and useful Improvements in Corn-Planters, of which the following is a specification:

The invention relates to machines for planting corn; and the improvements consists in a novel combination and arrangement of parts, whereby the apparatus is rendered very effective in operation.

The improvements will be fully hereinafter described.

Figure 1:
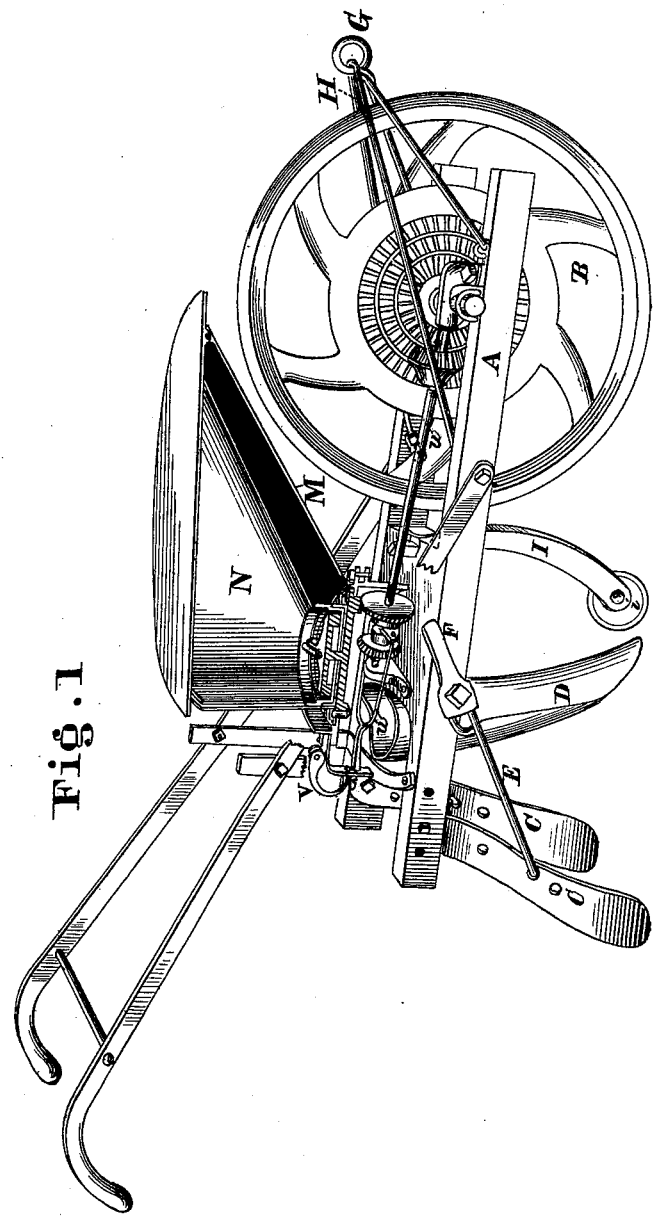
Figure 2:
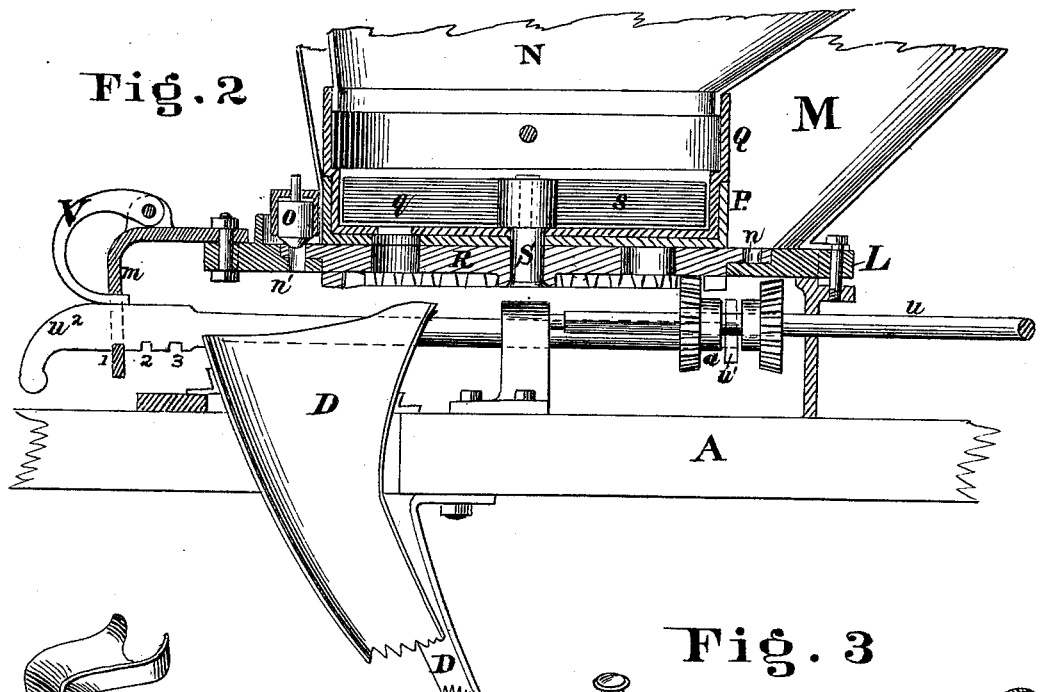
Figure 3:
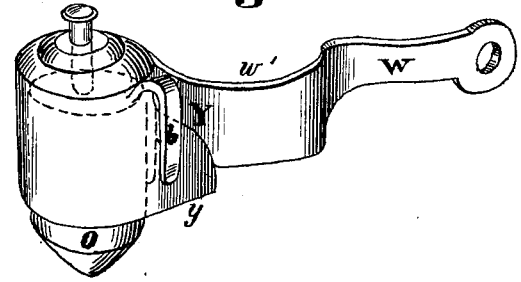
Figure 5:
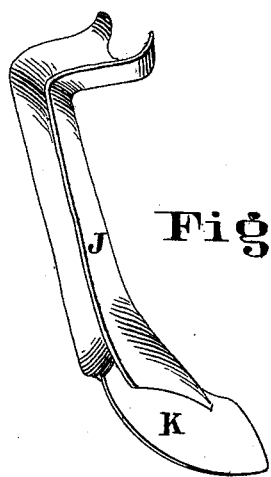
Figure 4:
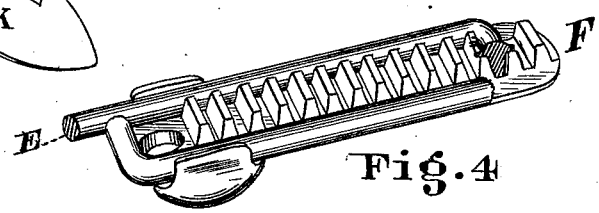
Figure 6:
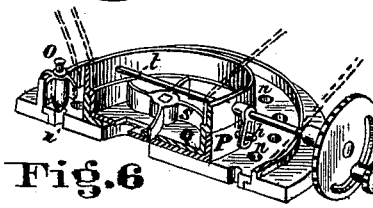

Figure 1 is a perspective view of the planter, the hoppers being shown in section, and portions of the handles and frame being broken off. On Sheet 2 are enlarged views, Fig. 2 being a partial sectional elevation, showing distributing devices; Fig. 3, a perspective view of the gravitating finger and floating cut-off; Fig. 4, a perspective view of the share brace and clamp; Fig. 5, a perspective view of the furrow shoe and cutter; and Fig. 6, a perspective view of delivery mechanism, with portions removed.

The frame A, ground-wheel B, grain-covering shares C, and grain spout and shovel D are constructed as described in reissued Letters Patent No. 6,270, granted to me February 2, 1875, but may be of any known construction.

E is a rod for bracing the covering-shares at any desired position, its beam end being provided with an elongated eye or slot, so that it may be adjusted by means of the clamp F, as clearly shown in Fig. 4. H is the draft chain or rod, adjustably attached to the side frames in rear of the axle, its front end being connected to a pivoted brace, G, for the twofold purpose of giving a downward draft, in order to prevent the pilot-wheel from sliding over the ground without revolving, and to so elevate the single-tree as not to strike the horse in turning. I is a shield, preferably curved backward, as shown, carrying a revolving cutter, $i$. It is securely attached to the frame on a line with the tread of the ground-wheel and the center of the furrow-tooth and grain-spout.

The object in having these three parts exactly in line, and in the relation shown, is that the pilot-wheel and shield and cutter may cooperate to protect the grain-spout from obstructions liable to catch on it, or, by entanglement, to obstruct its delivery, the pilot-wheel being designed to partially turn aside or crowd down clods or rubbish; and the revolving cutter following in the same line completes the work of clearing the path of the seed tube.

J is a furrow-opener, having a shoe-cutter, K, attached for the purpose of protecting its point from trash, and to make it run steadily in line with the pilot-wheel. It may be attached to the frame in any secure manner, instead of the one shown in Fig. 1, and may be applied to a shovel-plow or cultivator, as well as a corn-planter.

The combined seed and fertilizer distributer is composed of a bottom plate, L, having a vertical cylindrical flange, to which is connected the seed-hopper M, which conforms to the shape of said flange, except at the back, where it extends inward, as described in Reissue No. 6,040, and for the purposes there stated. The rear wall is substantially vertical, while the front extends forward and upward over the pilot-wheel, the top being elliptical, and the whole nearly the shape of a coal-scuttle.

For the combined use for which the hoppers are intended large carrying capacity is necessary. To extend the box either upward or on the sides would render the machine top-heavy and unsteady; and to extend it rearward would make it too heavy to lift from the ground, whereas by extending it forward the machine is rendered steadier in consequence of increased weight over the ground-wheel, while at the same time it is easier to handle.

Within said plate L is the rotating dropper R, provided with a series of holes, $n$, near its perimeter, for carrying the desired quantity of grain from the hopper to the delivery-spout D. Said dropper-plate R is also provided with another series of holes, in a circle of smaller diameter, through which the fertilizer is delivered into the delivery-spout D; or, instead of this inner series of holes, the center of the plate may be a spider-skeleton.

P is a gage-plate, of smaller diameter than the dropper-plate R, provided with a slotted tumbler, $h$; or, in lieu of the tumbler, a rack may be employed.

Q is the stationary bottom plate of the fertilizer-hopper N, and is provided with a vertical flange, to which said hopper N is attached, and an opening, q, for the descent of the fertilizer to the delivery-spout. The fertilizer-hopper is located within the grain-hopper, and is of the same general shape. The axis S of the dropper-plate R extends through the plates P and Q, and has upon it, within the fertilizer-hopper, an armed agitator, s, for carrying the fertilizer to the delivery-opening.

h is a slotted tumbler, carried on a rod, t, engaging with a pin on the gage-plate P, for regulating the size of the delivery-aperture from the fertilizer-hopper, and is locked in any desired position by the set-screw p'.

u is a shaft, geared to the drive-wheel in the usual manner, and carrying at its rear end a sleeve, a, provided with two bevel-gears, which mesh with either of two pinions on the bottom of the dropper-plate R.

The sleeve a slides on the shaft u, which is preferably polygonal. To this sleeve is attached a yoke, $u^1$, having an arm or handle, $u^2$, provided with notches 1 2 3, passing through a keeper, m, into either of which notches it is secured by the gravitating hinged lock V.

The speed at which the dropper is revolved will depend on which gear is in mesh, and this can be regulated by the operator at any time, whether the machine is in motion or not, by simply moving the shifting-rod $u^2$ in or out; and when it is desired to throw the operative parts out of gear said shifter is locked in notch 2.

The cut-off, enlarged in Fig. 3, is pivoted at the right-hand rear corner of the seed-box, so that its arm extends over the guard-flange cast on the plate L in rear of the hopper. It then curves, as seen at w', so as to leave a space between it and the rear wall of the seed-box, and is provided with a lug, b, which hooks loosely over said guard-flange, so as to allow the plunger end to rest on the dropper-plate over the delivery-hole n'. The lower end of the plunger O is cone shape, and is fitted with bearings, so as, by gravity, to conform to the surface of the revolving plate.

In front of the rear wall of the seed-box there is a brush arranged, as shown in my reissues aforesaid; but it is found by experience that the brush will not sweep off all grains of corn projecting above the cells in the dropper-plate, but, as the finger crosses the line of travel of these cells, should any extra grains be carried under the brush they will be kept back by the cut-off, and, instead of passing under to the delivery-aperture, will be carried around between the cut-off and the rear wall of the seed-box, and again enter the latter through an opening for that purpose at the opposite side thereof. As each cell, with its seed, reaches the delivery-opening n', the plunger descends and forces the seed on its way to the delivery-spout. Should, however, an extra grain be carried under the cut-off it will not be dropped, but will be forced to enter the cove y, and there be retained until removed by hand or until an empty cell approaches, when it will fall in and be advanced to the delivery-spout.

The form and arrangement of the cut-off and gravitating finger are such as to freely allow either a forward or backward rotation of the dropper-plate.

Having thus described the invention, what I claim, and desire to secure by Letters Patent, is—

1. The combination, with the seed-hopper M and perforated dropper-plate R, of the curved pivoted cut-off W and the gravitating cone-shaped plunger O, substantially as and for the purpose described.

2. The combination, with the rotating perforated dropper-plate and fertilizer-hopper N, of the annular gage-plate and cut-off P, the slotted tumbler h, engaging a pin on said gage-plate, the rod t, and set-screw p', substantially as and for the purpose described.

3. In combination with the covering-shares, the brace-rod E, having the elongated eye or slot at one end, adapted to engage any of the series of teeth in the clamp F, substantially as and for the purpose described.

4. In combination with the pilot-wheel B, the shield I and its revolving cutter i, arranged in line between the tread of said pilot-wheel and the center of the grain-spout, substantially as and for the purpose described.

In testimony whereof I have hereunto set my hand this 25th day of June, 1877.

JAMES CAMPBELL.

Witnesses:
EDWARD BOYD,
EDWARD ISSEN.